(12) United States Patent
Wada (10) Patent No.: US 12,005,935 B2
(45) Date of Patent: Jun. 11, 2024

(54) ARTICLE TRANSPORT FACILITY

(71) Applicant: Daifuku Co., Ltd., Osaka (JP)

(72) Inventor: Yoshinari Wada, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 701 days.

(21) Appl. No.: 17/236,472

(22) Filed: Apr. 21, 2021

(65) Prior Publication Data

US 2021/0331714 A1 Oct. 28, 2021

(30) Foreign Application Priority Data

Apr. 22, 2020 (JP) .................................. 2020-075835

(51) Int. Cl.
| | |
|---|---|
| *B61B 1/00* | (2006.01) |
| *G06T 7/593* | (2017.01) |
| *G06T 7/73* | (2017.01) |
| *H04N 7/18* | (2006.01) |
| *H04N 13/204* | (2018.01) |

(52) U.S. Cl.
CPC .............. *B61B 1/005* (2013.01); *G06T 7/593* (2017.01); *G06T 7/74* (2017.01); *H04N 7/188* (2013.01); *H04N 13/204* (2018.05); *G06T 2207/10012* (2013.01); *G06T 2207/30252* (2013.01)

(58) Field of Classification Search
CPC ........... B61B 1/005; G06T 7/593; G06T 7/74; G06T 2207/10012; G06T 2207/30252; H04N 7/188; H04N 13/204
See application file for complete search history.

(56) References Cited

U.S. PATENT DOCUMENTS

| | | | |
|---|---|---|---|
| 6,092,678 A | 7/2000 | Kawano et al. | |
| 9,589,821 B2 * | 3/2017 | Nishikawa | ........ H01L 21/67733 |
| 9,670,004 B1 * | 6/2017 | Horii | .................. G05B 19/4189 |
| 10,923,370 B2 * | 2/2021 | Harasaki | ............... H01L 21/681 |
| 2017/0247190 A1 * | 8/2017 | Horii | ..................... B65G 19/025 |

FOREIGN PATENT DOCUMENTS

JP 11349280 A 12/1999

* cited by examiner

*Primary Examiner* — Scott A Browne
(74) *Attorney, Agent, or Firm* — The Webb Law Firm (57) ABSTRACT

An overhead transport vehicle performs a first transfer operation of holding an article placed on a loading pedestal of a transport origin, and a second transfer operation of placing the article onto a loading pedestal of a transport destination. A control device causes a shooting device to obtain a first shot image of the upper face of the article placed on the loading pedestal of the transport origin, and adjusts the relative positional relationship between the holding portion and the article placed on the loading pedestal of the transport origin based on the first shot image and first reference image data, and causes the shooting device to obtain a second shot image of the upper face of the loading pedestal of the transport destination, and adjusts the relative positional relationship between the holding portion and the loading pedestal of the transport destination based on the second shot image and second reference image data.

7 Claims, 6 Drawing Sheets

ARTICLE TRANSPORT FACILITY

CROSS-REFERENCE TO RELATED APPLICATION

This application claims priority to Japanese Patent Application No. 2020-075835 filed Apr. 22, 2020, the disclosure of which is hereby incorporated by reference in its entirety.

BACKGROUND OF THE INVENTION

1. Field of the Invention

The present invention relates to an article transport facility that includes: a travel rail attached to a ceiling; a plurality of loading pedestals arranged along the travel rail; and at least one overhead transport vehicle that travels along the travel rail, and transports an article from the loading pedestal of a transport origin to the loading pedestal of a transport destination.

2. Description of the Related Art

In the above-described article transport facility, the overhead transport vehicle includes a holding portion that holds an article. Also, in order for the article to be able to be accurately transferred between the overhead transport vehicle and the loading pedestals, teaching processing of acquiring the positional relationship of the holding portion of the overhead transport vehicle relative to each loading pedestal, and setting the amount of adjustment of the position of the holding portion based on this positional relationship, so as to be able to adjust displacement in the relative positional relationship between the holding portion and the loading pedestal, is performed before the start of the operation of the facility. JP H11-349280A discloses a technique relating to such teaching processing. Note that in the following, the reference signs indicated in parentheses hereinafter correspond to those used in JP H11-349280A.

In the teaching processing disclosed in JP H11-349280A, first, a jig (11) including a collecting lens (12a) and a position detection element (12b) is placed on a loading pedestal (53). Then, the jig (11) is irradiated with light emitted from a pair of light-emitting diodes (7a, 7b) mounted on a holding portion (6). Then, a relative positional relationship between the holding portion (6) and the loading pedestal (53) is acquired based on an output signal of the position detection element (12b) that has received light collected by the collecting lens (12a), and an amount of adjustment of the position of the holding portion (6) relative to the loading pedestal (53) is set based on this positional relationship.

In the article transport facility disclosed in JP H11-349280A, such teaching processing is performed for each of the plurality of loading pedestals (53). Accordingly, time required before all of the teaching processing are complete increases with an increase in the number of loading pedestals (53). As a result, it takes a long time before the operation of the article transport facility is started.

SUMMARY OF THE INVENTION

Therefore, there is a demand for realizing an article transport facility in which time required before an operation is started can be suppressed.

In view of the aforementioned circumstances, an article transport facility has a characteristic configuration such that it includes:
a travel rail attached to a ceiling;
a plurality of loading pedestals arranged along the travel rail;
an overhead transport vehicle configured to travel along the travel rail, and transport an article from, among the plurality of loading pedestals, the loading pedestal of a transport origin to the loading pedestal of a transport destination;
a shooting device that is mounted on the overhead transport vehicle, and is configured to shoot a shooting subject located below the overhead transport vehicle to obtain a shot image; and
a control device configured to control the overhead transport vehicle and the shooting device;
wherein the overhead transport vehicle includes a holding portion for holding the article, and is configured to perform a first transfer operation of holding, using the holding portion, the article placed on the loading pedestal of the transport origin, and a second transfer operation of placing the article held by the holding portion onto the loading pedestal of the transport destination, and
letting image data based on the shot image in which an upper face of the article serves as the shooting subject, and that is obtained when a positional relationship between the overhead transport vehicle and the upper face of the article is in a reference state be first reference image data, and image data based on the shot image in which an upper face of the loading pedestal serves as the shooting subject, and that is obtained when a positional relationship between the overhead transport vehicle and the upper face of the loading pedestal is in a reference state be second reference image data,
when the overhead transport vehicle performs the first transfer operation, the control device executes, before the first transfer operation, first adjustment control of causing the shooting device to obtain a first shot image, which is the shot image in which the upper face of the article placed on the loading pedestal of the transport origin serves as the shooting subject, and adjusting a relative positional relationship between the holding portion and the article placed on the loading pedestal of the transport origin, based on the first shot image and the first reference image data; and
when the overhead transport vehicle performs the second transfer operation, the control device executes, before the second transfer operation, second adjustment control of causing the shooting device to obtain a second shot image, which is the shot image in which the upper face of the loading pedestal of the transport destination serves as the shooting subject, and adjusting a relative positional relationship between the holding portion and the loading pedestal of the transport destination, based on the second shot image and the second reference image data.

With this characteristic configuration, using the first reference image data and the second reference image data that are obtained before or after the operation of the article transport facility, the first adjustment control and the second adjustment control are executed during an operation of the article transport facility. In other words, there is no need to execute, before the operation of the article transport facility, teaching processing of acquiring a relative positional relationship between the holding portion and the shooting subject, and setting an amount of adjustment of the position of the holding portion based on this positional relationship, and it is sufficient to obtain the first reference image data and the second reference image data before or after the operation of the article transport facility. Accordingly, time required for a work before the operation of the article transport facility can be reduced drastically. Accordingly, it is possible to suppress the time required before the operation of the article transport facility is started.

DETAILED DESCRIPTION OF PREFERRED EMBODIMENTS

Figure 1:
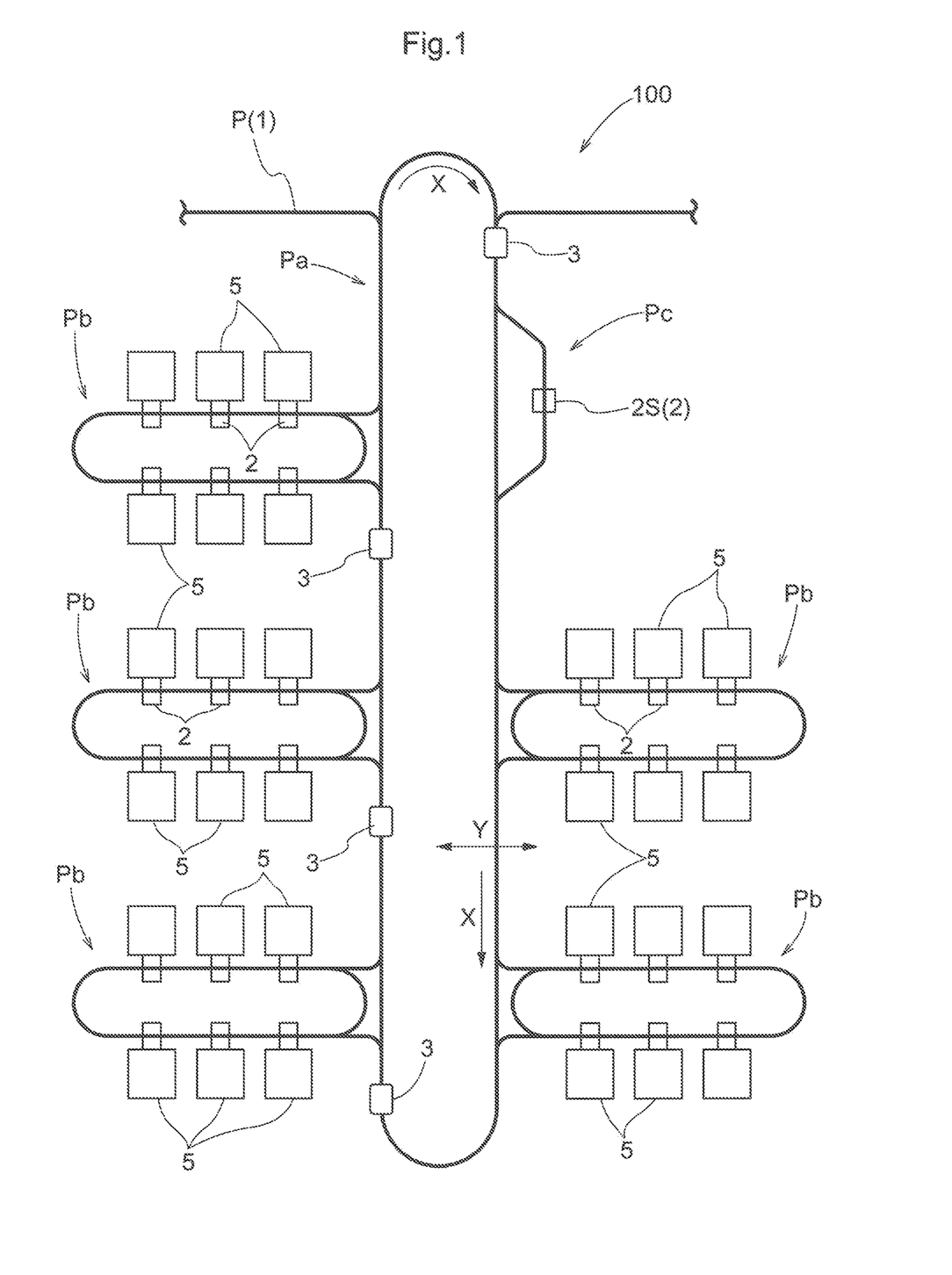
FIG. 1 is a schematic view illustrating an overall configuration of an article transport facility according to an embodiment.
Figure 2:
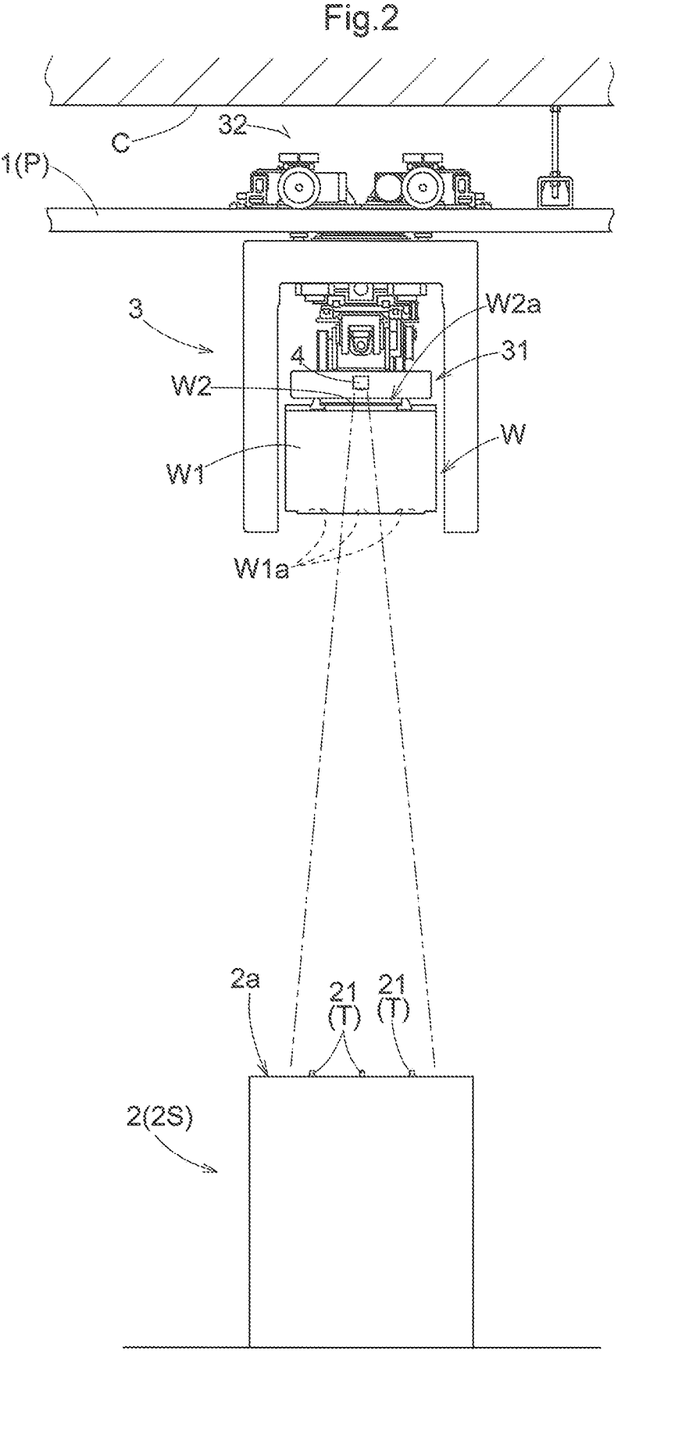
FIG. 2 is a side view illustrating an aspect in which a shooting subject is shot by a shooting device mounted on an overhead transport vehicle.

Hereinafter, an article transport facility 100 according to an embodiment will be described with reference to the drawings. As shown in FIGS. 1 and 2, the article transport facility 100 includes: a travel rail 1 attached to a ceiling C; a plurality of loading pedestals 2 arranged along the travel rail 1; overhead transport vehicles 3 that travel along the travel rail 1, and transport an article W from, among the plurality of loading pedestals 2, the loading pedestal 2 of a transport origin to the loading pedestal 2 of a transport destination; and a shooting device 4 mounted on the overhead transport vehicle 3. In the present embodiment, a plurality of overhead transport vehicles 3 are arranged along the travel rail 1. Accordingly, in the present embodiment, the same number of shooting devices 4 as the number of overhead transport vehicles 3 are provided. Also, in the present embodiment, the article W is a front opening-type container, called FOUP (Front Opening Unified Pod), that houses a plurality of semiconductor wafers.

As shown in FIG. 1, the travel rail 1 extends so as to form a travel path P for the overhead transport vehicles 3. In the following description, a direction along the travel rail 1 is defined as "travel direction X", a direction that is orthogonal to this travel direction X when viewed in a plan view is defined as "width direction Y". Furthermore, a direction along the vertical direction is defined as "up-down direction Z".

In the present embodiment, the travel path P includes: a first path Pa formed in a ring; a plurality of second paths Pb formed in a smaller ring than the first path Pa so as to be branched from and merged into the first path Pa; and a third path Pc formed so as to be branched from and merged into the first path Pa.

Each of the plurality of second paths Pb is provided with a plurality of loading pedestals 2. In the present embodiment, each of the plurality of second paths Pb is also provided with a plurality of processing devices 5. The processing devices 5 are each a device that performs various types of processing such as thin-film formation, photolithography, and etching on the semiconductor wafers taken out of the article W. The same number of processing devices 5 as the number of loading pedestals 2 are provided, and are aligned in the width direction Y.

The third path Pc is provided with one loading pedestal 2. In the following, the loading pedestal 2 arranged on the third path Pc is defined as a "reference loading pedestal 2S". The reference loading pedestal 2S is used when later-described first reference image data SD1 and second reference image data SD2 are acquired.

As shown in FIG. 2, the overhead transport vehicle 3 includes a holding portion 31 that holds the article W. The overhead transport vehicle 3 is configured to perform a "first transfer operation" of holding, using the holding portion 31, the article W placed on the loading pedestal 2 of the transport origin, and a "second transfer operation" of placing the article W held by the holding portion 31 onto the loading pedestal 2 of the transport destination.

In the present embodiment, the article W includes a housing portion W1 that houses the plurality of semiconductor wafers, and a flange portion W2 that is held by the holding portion 31. The flange portion W2 protrudes upward from the housing portion W1, and extends therefrom in a direction orthogonal to the up-down direction Z. In this way, in the present embodiment, the article W is a container provided with, in an upper portion of the article W, the flange portion W2 that is held by the holding portion 31.

Each loading pedestal 2 is configured so that the article W can be placed on a pedestal upper face 2a, which is an upper face of the loading pedestal 2. The pedestal upper face 2a is a plain face that extends along a horizontal plane. In the present embodiment, the loading pedestal 2 includes a plurality of projections 21 formed protruding from the pedestal upper face 2a. The plurality of projections 21 are configured to respectively engage with a plurality of recesses W1a formed in the bottom surface of the article W. In the present example, the projections 21 are respectively arranged at three positions that correspond to the apexes of a triangle when viewed in a plan view (see FIG. 6). In other words, in the present example, each of the three projections 21 is configured as a kinematic pin. The plurality of recesses W1a are formed in the shape of a groove that is recessed upward from the bottom surface of the article W. In the present embodiment, the plurality of recesses W1a are formed extending radially from a reference position on the bottom surface of the housing portion W1 of the article W. Furthermore, in the present embodiment, each of the plurality of recesses W1a is formed so as to be tapered toward the upper side so that the inner side surface of the recess W1a is inclined surface.

Figure 3:
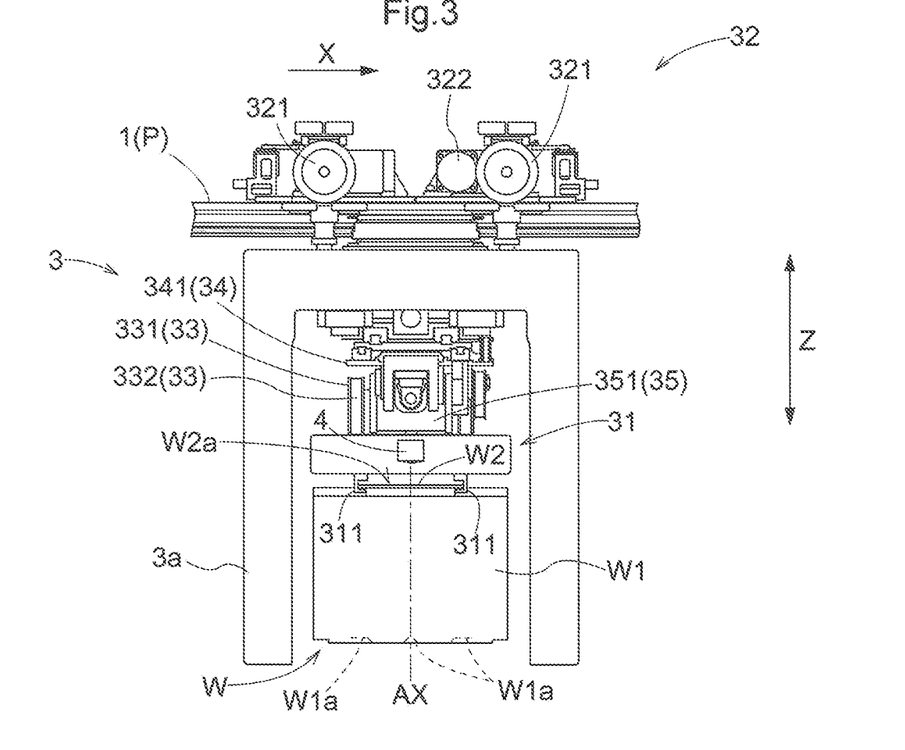
FIG. 3 is a side view illustrating a configuration of the overhead transport vehicle.

As shown in FIG. 3, in the present embodiment, the overhead transport vehicle 3 includes, in addition to the holding portion 31, a travel unit 32 that travels in the travel direction X, a lifting/lowering drive unit 33 that moves the holding portion 31 up and down with respect to the travel unit 32, a slide drive unit 34 that causes the holding portion 31 to slide with respect to the travel unit 32 in the width direction Y, and a rotation drive unit 35 that rotates the holding portion 31 with respect to the travel unit 32 around a rotation axis AX that extends in the up-down direction Z.

Figure 4:
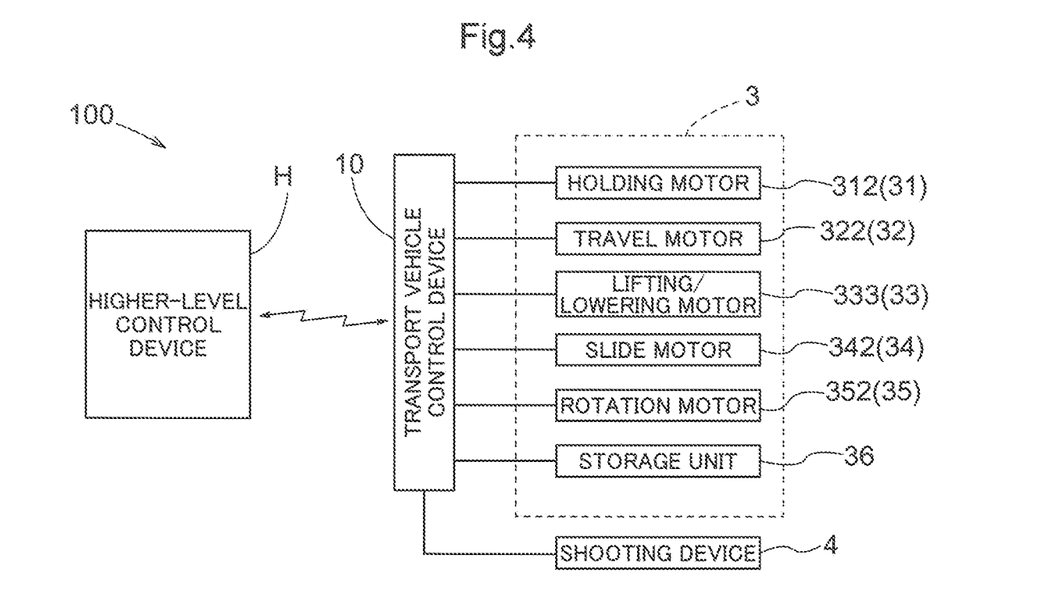
FIG. 4 is a block diagram illustrating a system configuration of the article transport facility.

As shown in FIGS. 3 and 4, in the present embodiment, the holding portion 31 includes a pair of holding claws 311 that hold the flange portion W2 of the article W, and a holding motor 312 that activates the pair of holding claws 311. The pair of holding claws 311 are configured to move closer to each other and separate from each other in a direction orthogonal to the up-down direction Z, due to the drive force of the holding motor 312. When the pair of holding claws 311 move closer to each other, the holding portion 31 enters a holding state of holding the article W. On the other hand, when the pair of holding claws 311 move separate from each other, the holding portion 31 enters a released state of not holding the article W.

The travel unit 32 includes a plurality of travel wheels 321 that roll on the travel rail 1, and a travel motor 322 that rotates at least one of the plurality of travel wheels 321. As a result of the at least one of the plurality of travel wheels 321 being rotated and rolling on the travel rail 1 due to the drive force of the travel motor 322, the remaining travel wheel 321 also rolls on the travel rail 1. Thus, the overhead transport vehicle 3 travels along the travel rail 1.

The lifting/lowering drive unit 33 includes a pulley 331, a belt 332 wound around the pulley 331, and a lifting/lowering motor 333 that rotates the pulley 331. The pulley 331 is supported by the rotation drive unit 35 so as to be rotatable. A leading end of the belt 332 is coupled to the holding portion 31. The lifting/lowering motor 333 performs normal rotation to rotate the pulley 331 so that the belt 332 is wound. Also, the lifting/lowering motor 333 performs reverse rotation to rotate the pulley 331 so that the belt 332 is unreeled. Accordingly, the lifting/lowering drive unit 33 moves the holding portion 31 up and down with respect to the travel unit 32.

The slide drive unit 34 includes a relay portion 341 supported by the travel unit 32 so as to be slidable in the width direction Y, and a slide motor 342 that causes the relay portion 341 to slide in the width direction Y. The relay portion 341 supports the rotation drive unit 35 from above. As a result of the relay portion 341 sliding in the width direction Y due to the drive force of the slide motor 342, the holding portion 31 slides in the width direction Y via the rotation drive unit 35 supported by the relay portion 341 and the lifting/lowering drive unit 33 supported by the rotation drive unit 35. Thus, the slide drive unit 34 causes the holding portion 31 to slide with respect to the travel unit 32 in the width direction Y.

The rotation drive unit 35 includes a rotating body 351 that is supported by the relay portion 341 so as to be rotatable around the rotation axis AX, and a rotation motor 352 that rotates the rotating body 351. The rotating body 351 supports the pulley 331 of the lifting/lowering drive unit 33 so that the pulley 331 is rotatable. As a result of the rotating body 351 rotating around the rotation axis AX due to the drive force of the rotation motor 352, the holding portion 31 rotates around the rotation axis AX via the lifting/lowering drive unit 33 supported by the rotating body 351. Thus, the rotation drive unit 35 rotates the holding portion 31 with respect to the travel unit 32 around the rotation axis AX, which extends in the up-down direction Z.

In the present embodiment, each of the plurality of overhead transport vehicles 3 includes a cover body 3a. The cover body 3a is formed so as to cover the article W that is being transported by the overhead transport vehicle 3. In the present embodiment, the cover body 3a is formed so as to cover the article W held by the holding portion 31 from both sides in the travel direction X and from above, in a state in which the holding portion 31 supported by the lifting/lowering drive unit 33 is located at an uppermost position. Also, in the present embodiment, the cover body 3a is supported by the travel unit 32.

As shown in FIG. 4, in the present embodiment, each of the plurality of overhead transport vehicles 3 further includes a storage unit 36 for storing the later-described first reference image data SD1 and second reference image data SD2.

As shown in FIG. 2, the shooting device 4 is mounted on the overhead transport vehicle 3. In the present embodiment, the shooting device 4 is mounted on the holding portion 31 of the overhead transport vehicle 3. The shooting device 4 shoots a shooting subject T located below the overhead transport vehicle 3 to obtain a shot image IM (see FIGS. 5 and 6). Accordingly, the shooting device 4 is arranged at a position at which the shooting device 4 can shoot the shooting subject T located below the overhead transport vehicle 3 even when the holding portion 31 holds the article W. For example, the shooting device 4 is arranged at a position at which the shooting device 4 does not overlap the article W held by the holding portion 31 when viewed in a plan view. Here, the expression of two elements being arranged so as to "overlap each other when viewed in a specific directional view" means that, when a virtual straight line that is parallel to this viewing direction is moved in a direction orthogonal to this virtual straight line, there is at least a region in which the virtual straight line intersects with both of the two elements.

As shown in FIG. 4, the article transport facility 100 includes a transport vehicle control device 10 that controls the overhead transport vehicle 3, and a higher-level control device H that outputs a command to the transport vehicle control device 10.

The transport vehicle control device 10 is installed in the overhead transport vehicle 3. In the present embodiment, the transport vehicle control device 10 controls the holding portion 31, the travel unit 32, the lifting/lowering drive unit 33, the slide drive unit 34, and the rotation drive unit 35. Specifically, the transport vehicle control device 10 is connected to the holding motor 312, the travel motor 322, the lifting/lowering motor 333, the slide motor 342, and the rotation motor 352 so as to be able to transmit and receive a signal (for example, an electric signal) thereto and therefrom, and controls the operations thereof.

In the present embodiment, the transport vehicle control device 10 also controls, in addition to the overhead transport vehicle 3, the shooting device 4 mounted on the overhead transport vehicle 3. That is to say, in the present embodiment, the transport vehicle control device 10 functions as a "control device" that controls the overhead transport vehicle 3 and the shooting device 4.

When the overhead transport vehicle 3 performs the above-described first transfer operation, the transport vehicle control device 10 executes, before this first transfer operation, first adjustment control of adjusting the relative positional relationship between the holding portion 31 and the article W placed on the loading pedestal 2 of the transport origin. In the first adjustment control, the transport vehicle control device 10 first causes the shooting device 4 to obtain a first shot image IM1, which is the shot image IM in which the upper face of the article W placed on the loading pedestal 2 of the transport origin serves as the shooting subject T. Then, the transport vehicle control device 10 adjusts, based on the first shot image IM1 and the first reference image data SD1, the relative positional relationship between the holding portion 31 and the article W placed on the loading pedestal 2 of the transport origin.

The first reference image data SD1 is image data based on the shot image IM in which the upper face of the article W serves as the shooting subject T, the shot image IM being obtained when the positional relationship between the overhead transport vehicle 3 and the upper face of the article W is in a reference state. In this context, "reference state" refers to a state in which the article W can be transferred accurately between the overhead transport vehicle 3 and the loading pedestal 2 while the holding portion 31 is located at the reference position. Note that the reference position of the holding portion 31 is not limited to the mechanical initial position of the holding portion 31, and may be a position changed in any direction from the initial position. Even the changed position of the holding portion 31 can serve as the reference position as long as it is set by the transport vehicle control device 10.

The first reference image data SD1 is obtained, for example, in the following manner. First, an operator adjusts the position of the overhead transport vehicle 3 and the position of the article W placed on the loading pedestal 2, so that the positional relationship between the overhead transport vehicle 3 and the upper face of the article W is in the reference state. Then, the transport vehicle control device 10 causes the shooting device 4 to obtain a shot image IM in which the upper face of the article W serves as the shooting subject T. Then, the transport vehicle control device 10 subjects this shot image IM to suitable image processing (such as binarization and edge detection), and thereby obtains the first reference image data SD1. In the present embodiment, the first reference image data SD1 is obtained for the reference loading pedestal 2S (see FIG. 1).

In the present embodiment, the flange portion W2 is provided in the upper portion of the article W, as described above. Accordingly, the upper face of the article W serving as the shooting subject T includes a flange upper face W2a of the flange portion W2. That is to say, in the present embodiment, when the shooting device 4 shoots the flange upper face W2a of the flange portion W2, both the shot image IM and the first shot image IM1 on which the first reference image data SD1 is based are obtained.

Figure 5:
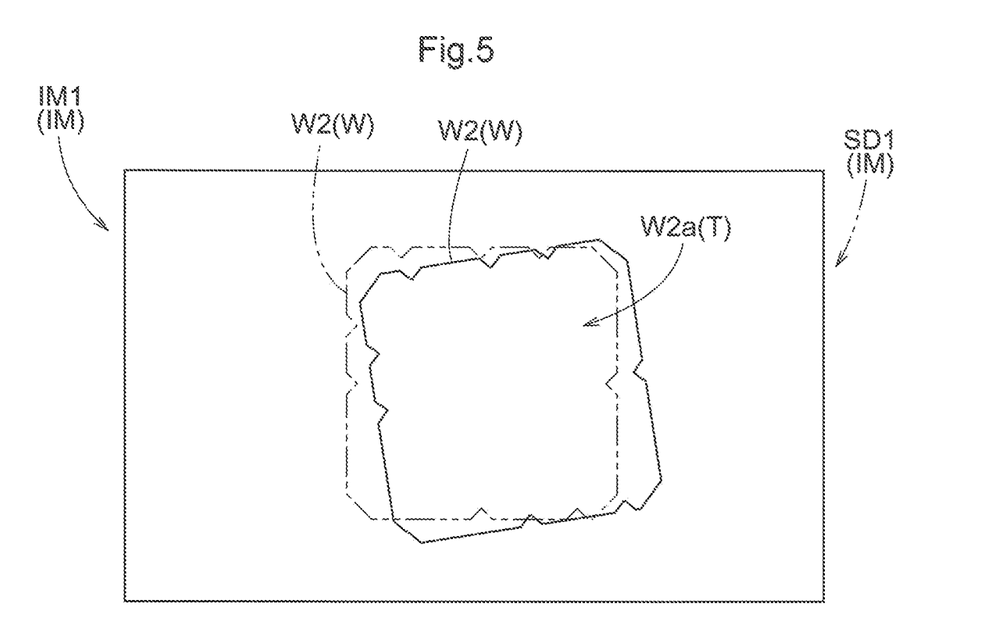
FIG. 5 is a diagram illustrating a contrast between a first shot image and a first reference image data.

As shown in FIG. 5, in the present embodiment, typically, at least one of the position and orientation of the flange upper face W2a in the first shot image IM1 is displaced with the flange upper face W2a in the first reference image data SD1 as a reference. In the first adjustment control of the present embodiment, the transport vehicle control device 10 adjusts the position and orientation of the holding portion 31 so that the position and orientation of the flange upper face W2a in the first shot image IM1 correspond to the position and orientation of the flange upper face W2a in the first reference image data SD1. Specifically, the position of the holding portion 31 in the travel direction X is adjusted by controlling the travel unit 32, the position of the holding portion 31 in the width direction Y is adjusted by controlling the slide drive unit 34, and the rotational position of the holding portion 31 around the rotation axis AX is adjusted by controlling the rotation drive unit 35. Here, the position of the holding portion 31 is adjusted so that the position and orientation of the flange upper face W2a in the first shot image IM1 shot based on the adjusted position of the holding portion 31 match the position and orientation of the flange upper face W2a in the first reference image data SD1. In other words, in the first adjustment control, the position and orientation of the holding portion 31 are adjusted so that the relative positional relationship between the holding portion 31 and the flange upper face W2a matches the positional relationship between the holding portion 31 and the flange upper face W2a in the reference state. Note that the first shot image IM1 may also be subjected to suitable image processing (such as binarization and edge detection), when the first shot image IM1 is compared with the first reference image data SD1.

Also, when the overhead transport vehicle 3 performs the above-described second transfer operation, the transport vehicle control device 10 executes, before this second transfer operation, second adjustment control for adjusting the relative positional relationship between the holding portion 31 and the loading pedestal 2 of the transport destination. In the second adjustment control, the transport vehicle control device 10 first causes the shooting device 4 to obtain a second shot image IM2, which is the shot image IM in which the pedestal upper face 2a of the loading pedestal 2 of the transport destination serves as the shooting subject T. Then, the transport vehicle control device 10 adjusts, based on the second shot image IM2 and the second reference image data SD2, the relative positional relationship between the holding portion 31 and the loading pedestal 2 of the transport destination.

The second reference image data SD2 is image data based on the shot image IM in which the pedestal upper face 2a of the loading pedestal 2 serves as a shooting subject T, the shot image IM being obtained when the positional relationship between the overhead transport vehicle 3 and the pedestal upper face 2a of the loading pedestal 2 is in the reference state.

The second reference image data SD2 is obtained, for example, in the following manner. First, the operator adjusts the position of the overhead transport vehicle 3 so that the positional relationship between the overhead transport vehicle 3 and the pedestal upper face 2a of the loading pedestal 2 is in the reference state. Then, the transport vehicle control device 10 causes the shooting device 4 to obtain a shot image IM in which the pedestal upper face 2a of the loading pedestal 2 serves as the shooting subject T. Then, the transport vehicle control device 10 subjects this shot image IM to suitable image processing (such as binarization and edge detection), and thereby obtains the second reference image data SD2. In the present embodiment, similar to the first reference image data SD1, the second reference image data SD2 is obtained for the reference loading pedestal 2S (see FIG. 1).

As described above, in the present embodiment, the plurality of projections 21 protrude from the pedestal upper face 2a of the loading pedestal 2. Accordingly, the pedestal upper face 2a of the loading pedestal 2 serving as the shooting subject T includes the plurality of projections 21. That is to say, in the present embodiment, when the shooting device 4 shoots the plurality of projections 21, both the shot image IM and the second shot image IM2 are obtained on which the second reference image data SD2 is based.

Figure 6:
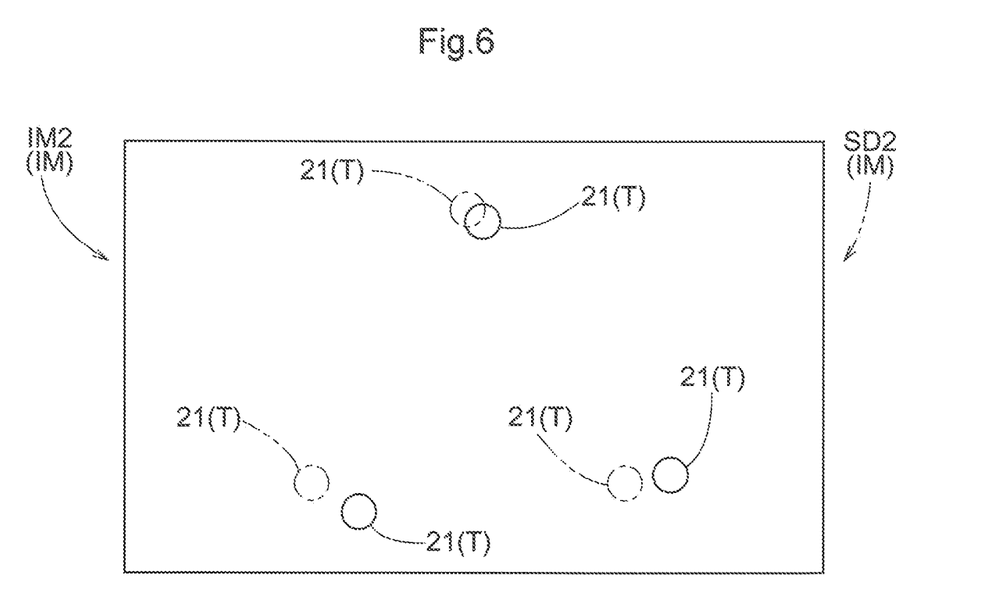
FIG. 6 is a diagram illustrating a contrast between a second shot image and a second reference image data.

As shown in FIG. 6, in the present embodiment, typically, at least one of the position and orientation of the plurality of projections 21 in the second shot image IM2 is displaced with the plurality of projections 21 in the second reference image data SD2 as a reference. In the second adjustment control of the present embodiment, the transport vehicle control device 10 adjusts the position and orientation of the holding portion 31 so that the position and orientation of the plurality of projections 21 in the second shot image IM2 match the position and orientation of the plurality of projections 21 in the second reference image data SD2. Specifically, the position of the holding portion 31 in the travel direction X is adjusted by controlling the travel unit 32, the position of the holding portion 31 in the width direction Y is adjusted by controlling the slide drive unit 34, and the rotational position of the holding portion 31 around the rotation axis AX is adjusted by controlling the rotation drive unit 35. Here, the position of the holding portion 31 is adjusted so that the position and orientation of the plurality of projections 21 in the second shot image IM2 shot based on the adjusted position of the holding portion 31 match the position and orientation of the plurality of projections 21 in the second reference image data SD2. In other words, in the second adjustment control, the position and orientation of the holding portion 31 are adjusted so that the relative positional relationship between the holding portion 31 and the plurality of projections 21 matches the positional relationship between the holding portion 31 and the plurality of projections 21 in the reference state. Note that the second shot image IM2 may also be subjected to suitable image processing (such as binarization and edge detection), when the second shot image IM2 is compared with the second reference image data SD2.

In the present embodiment, the shooting device 4 is a stereo camera. Therefore, the transport vehicle control device 10 is capable of calculating the distance between the overhead transport vehicle 3 and the shooting subject T in the up-down direction Z, based on the shot image IM obtained by the shooting device 4. The transport vehicle control device 10 controls the lifting/lowering drive unit 33 to adjust the position of the holding portion 31 in the up-down direction Z so that the distance between the overhead transport vehicle 3 and the shooting subject T in the up-down direction Z matches a preset reference distance. In the present embodiment, in this way, the distance between the overhead transport vehicle 3 and the shooting subject T in the up-down direction Z is calculated based on the shot image IM, and the position of the holding portion 31 in the up-down direction Z is adjusted by controlling the lifting/lowering drive unit 33 in each of the first adjustment control and the second adjustment control.

Figure 7:
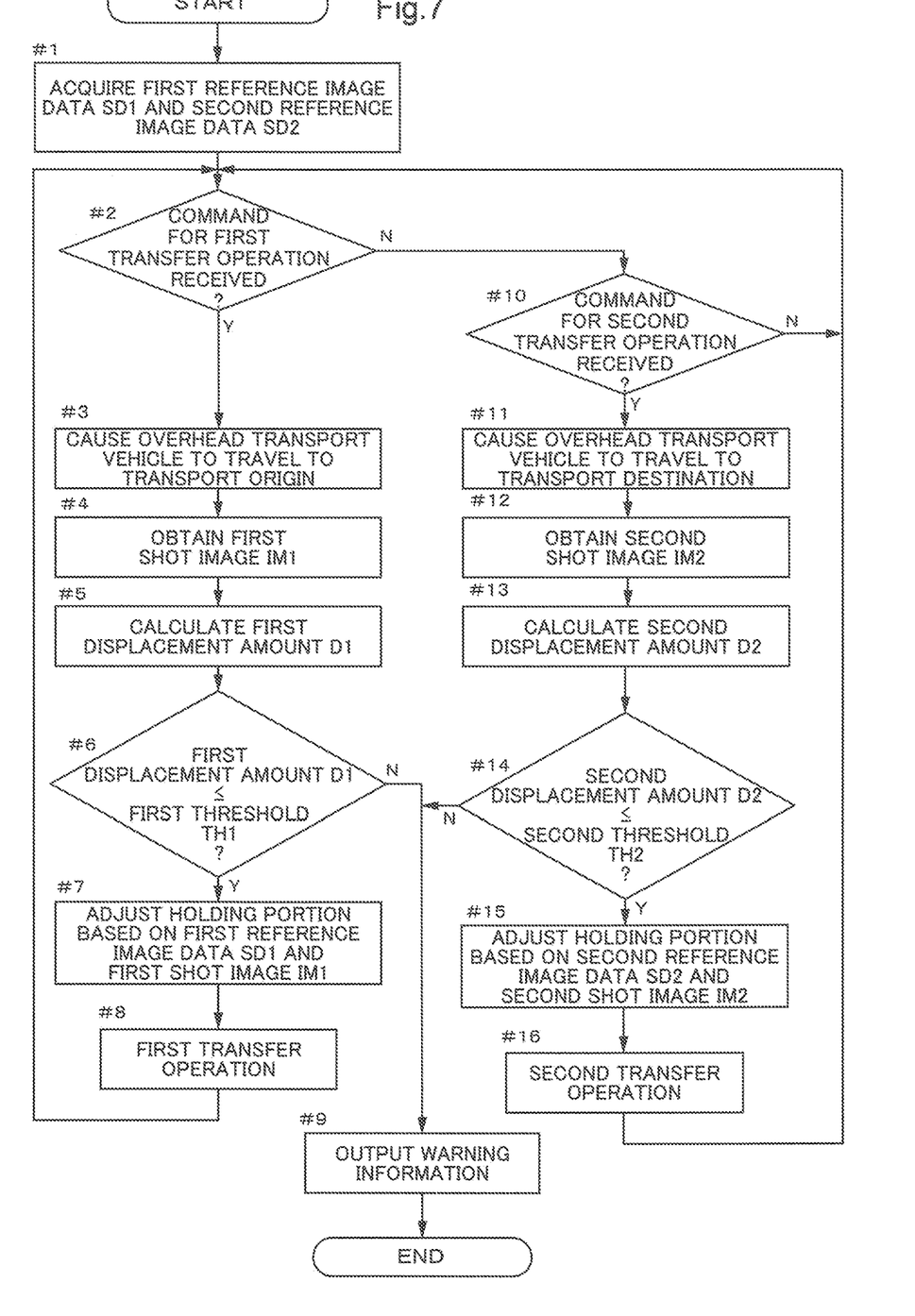
FIG. 7 is a flowchart illustrating an example of control processing performed by a control device.

The following will describe control processing performed by the transport vehicle control device 10 according to the present embodiment with reference to FIG. 7. FIG. 7 is a flowchart showing an example of the control processing performed by the transport vehicle control device 10.

As shown in FIG. 7, first, the transport vehicle control device 10 acquires the first reference image data SD1 and the second reference image data SD2 (step #1). At this time, the transport vehicle control device 10 stores the first reference image data SD1 and the second reference image data SD2 in the storage unit 36 of the overhead transport vehicle 3 in which the transport vehicle control device 10 is installed. Note that the procedure for obtaining the first reference image data SD1 and the second reference image data SD2 is as described above.

Then, the transport vehicle control device 10 checks whether or not a command for causing the overhead transport vehicle 3 to execute the first transfer operation has been output from the higher-level control device H (step #2).

If the command for causing the overhead transport vehicle 3 to execute the first transfer operation has been output from the higher-level control device H (Y in step #2), the transport vehicle control device 10 controls the travel unit 32 so that the overhead transport vehicle 3 travels to a position that is located above the loading pedestal 2 of the transport origin and at which the overhead transport vehicle 3 executes the first transfer operation (step #3).

Then, the transport vehicle control device 10 causes the shooting device 4 mounted on the overhead transport vehicle 3 in which the transport vehicle control device 10 is installed to obtain the first shot image IM1 (step #4).

Subsequently, the transport vehicle control device 10 calculates a first displacement amount D1, which is an amount of displacement of the flange upper face W2a of the article W in the first shot image IM1 with the first reference image data SD1 as a reference (step #5). Here, the first displacement amount D1 includes an amount of displacement in the travel direction X, an amount of displacement in the width direction Y, and an amount of displacement in a rotational direction around the rotation axis AX. Also, the transport vehicle control device 10 determines whether or not the first displacement amount D1 exceeds a prescribed first threshold TH1 (step #6). In this determination, for example, the first displacement amount D1 can be defined as at least one of: (1) the amount of displacement of the flange upper face W2a in the travel direction X in the first shot image IM1 with the flange upper face W2a in the first reference image data SD1 as a reference; (2) the amount of displacement of the flange upper face W2a in the width direction Y in the first shot image IM1 with the flange upper face W2a in the first reference image data SD1 as a reference; and (3) the amount of displacement of the flange upper face W2a in the rotational direction around the rotation axis AX in the first shot image IM1 with the flange upper face W2a in the first reference image data SD1 as a reference.

If the first displacement amount D1 is less than or equal to the first threshold TH1 (Y in step #6), the transport vehicle control device 10 adjusts the relative positional relationship between the holding portion 31 and the article W placed on the loading pedestal 2 of the transport origin, based on the first shot image IM1 and the first reference image data SD1 (step #7).

In step #7, if the flange upper face W2a in the first shot image IM1 is displaced in the travel direction X with the flange upper face W2a in the first reference image data SD1 as a reference, the transport vehicle control device 10 controls the travel unit 32 and adjusts the position of the holding portion 31 in the travel direction X so that the position of the flange upper face W2a in the travel direction X in the first shot image IM1, which is shot based on the adjusted position of the holding portion 31, corresponds to the position of the flange upper face W2a in the travel direction X in the first reference image data SD1. Furthermore, if the flange upper face W2a in the first shot image IM1 is displaced in the width direction Y with the flange upper face W2a in the first reference image data SD1 as a reference, the transport vehicle control device 10 controls the slide drive unit 34 and adjusts the position of the holding portion 31 in the width direction Y so that the position of the flange upper face W2a in the width direction Y in the first shot image IM1, which is shot based on the adjusted position of the holding portion 31, corresponds to the position of the flange upper face W2a in the width direction Y in the first reference image data SD1. Moreover, if the flange upper face W2a in the first shot image IM1 is displaced in the rotational direction around the rotation axis AX with the flange upper face W2a in the first reference image data SD1 as a reference, the transport vehicle control device 10 controls the rotation drive unit 35 and adjusts the rotational position of the holding portion 31 around the rotation axis AX so that the position of the flange upper face W2a in the rotational direction around the rotation axis AX in the first shot image IM1, which is shot based on the adjusted position of the holding portion 31, corresponds to the position of the flange upper face W2a in the rotational direction around the rotation axis AX in the first reference image data SD1.

Also, in step #7, if the shooting device 4 is a stereo camera, the transport vehicle control device 10 calculates the distance between the overhead transport vehicle 3 and the flange upper face W2a of the article W in the up-down direction Z based on the first shot image IM1. Also, the transport vehicle control device 10 controls the lifting/lowering drive unit 33 and adjusts the position of the holding portion 31 in the up-down direction Z so that the distance between the overhead transport vehicle 3 and the flange upper face W2a of the article W in the up-down direction Z matches the preset reference distance.

After the above-described adjustment performed by the holding portion 31, the transport vehicle control device 10 causes the overhead transport vehicle 3 to execute the first transfer operation (step #8). Then, the transport vehicle control device 10 repeats the control from steps #2 onwards.

If the first displacement amount D1 exceeds the first threshold TH1 (N in step #6), the transport vehicle control device 10 outputs warning information (step #9). The expression "outputting warning information" includes, for example, outputting a voice for urging an operator to pay attention, displaying a screen for the same, or outputting such warning information to the higher-level control device H. In this way, if, in the first adjustment control, the amount of displacement (first displacement amount D1) of the upper face of the article W (here, the flange upper face W2a) in the first shot image IM1 with the first reference image data SD1 as a reference exceeds the first threshold TH1, the transport vehicle control device 10 outputs the warning information without causing the overhead transport vehicle 3 to execute the first transfer operation. Note that the above-described steps #2 to #7 correspond to the first adjustment control.

If the command for causing the overhead transport vehicle 3 to execute the first transfer operation has not been output from the higher-level control device H (N in step #2), the transport vehicle control device 10 checks whether or not a command for causing the overhead transport vehicle 3 to execute the second transfer operation has been output from the higher-level control device H (step #10).

If the command for causing the overhead transport vehicle 3 to execute the second transfer operation has not been output from the higher-level control device H (N in step #10), the control of steps #2 onwards is repeated.

On the other hand, if the command for causing the overhead transport vehicle 3 to execute the second transfer operation has been output from the higher-level control device H (Y in step #10), the transport vehicle control device 10 controls the travel unit 32 so that the overhead transport vehicle 3 travels to a position that is located above the loading pedestal 2 of the transport destination and at which the overhead transport vehicle 3 executes the second transfer operation (step #11).

Then, the transport vehicle control device 10 causes the shooting device 4 mounted on the overhead transport vehicle 3 in which the transport vehicle control device 10 is installed to obtain the second shot image IM2 (step #12).

Subsequently, the transport vehicle control device 10 calculates a second displacement amount D2, which is an amount of displacement of the plurality of projection 21 in the second shot image IM2 with the second reference image data SD2 as a reference (step #13). Here, the second displacement amount D2 includes an amount of displacement in the travel direction X, an amount of displacement in the width direction Y, and an amount of displacement in the rotational direction around the rotation axis AX. Also, the transport vehicle control device 10 determines whether or not the second displacement amount D2 exceeds a prescribed second threshold TH2 (step #14). In this determination, for example, the second displacement amount D2 can be defined as at least one of: (1) the amount of displacement of the plurality of projections 21 in the travel direction X in the second shot image IM2 with the plurality of projections 21 in the second reference image data SD2 as a reference; (2) the amount of displacement of the plurality of projections 21 in the width direction Y in the second shot image IM2 with the plurality of projections 21 in the second reference image data SD2 as a reference; and (3) the amount of displacement of the plurality of projections 21 in the rotational direction around the rotation axis AX in the second shot image IM2 with the plurality of projections 21 in the second reference image data SD2 as a reference.

If the second displacement amount D2 is less than or equal to the second threshold TH2 (Y in step #14), the transport vehicle control device 10 adjusts the relative positional relationship between the holding portion 31 and the loading pedestal 2 of the transport destination, based on the second shot image IM2 and the second reference image data SD2 (step #15).

In step #15, if the plurality of projections 21 in the second shot image IM2 are displaced in the travel direction X with the plurality of projections 21 in the second reference image data SD2 as a reference, the transport vehicle control device 10 controls the travel unit 32 and adjusts the position of the holding portion 31 in the travel direction X so that the positions of the plurality of projections 21 in the travel direction X in the second shot image IM2, which is shot based on the adjusted position of the holding portion 31, correspond to the positions of the plurality of projections 21 in the travel direction X in the second reference image data SD2. Furthermore, if the plurality of projections 21 in the second shot image IM2 are displaced in the width direction Y with the plurality of projections 21 in the second reference image data SD2 as a reference, the transport vehicle control device 10 controls the slide drive unit 34 and adjusts the position of the holding portion 31 in the width direction Y so that the positions of the plurality of projections 21 in the width direction Y in the second shot image IM2, which is shot based on the adjusted position of the holding portion 31, correspond to the positions of the plurality of projections 21 in the width direction Y in the second reference image data SD2. Also, if the plurality of projections 21 in the second shot image IM2 are displaced in the rotational direction around the rotation axis AX with the plurality of projections 21 in the second reference image data SD2 as a reference, the transport vehicle control device 10 controls the rotation drive unit 35 and adjusts the rotational position of the holding portion 31 around the rotation axis AX so that the positions of the plurality of projections 21 in the rotational direction around the rotation axis AX in the second shot image IM2, which is shot based on the adjusted position of the holding portion 31, correspond to the positions of the plurality of projections 21 in the rotational direction around the rotation axis AX in the second reference image data SD2.

Also, in step #15, if the shooting device 4 is a stereo camera, the transport vehicle control device 10 calculates the distance between the overhead transport vehicle 3 and the plurality of projections 21 of the loading pedestal 2 in the up-down direction Z based on the second shot image IM2. Also, the transport vehicle control device 10 controls the lifting/lowering drive unit 33 and adjusts the position of the holding portion 31 in the up-down direction Z so that the distance between the overhead transport vehicle 3 and the plurality of projections 21 of the loading pedestal 2 in the up-down direction Z matches the preset reference distance.

After the above-described adjustment of the holding portion 31, the transport vehicle control device 10 causes the overhead transport vehicle 3 to execute the second transfer operation (step #16). Then, the transport vehicle control device 10 repeats the control from steps #2 onwards.

If the second displacement amount D2 exceeds the second threshold TH2 (N in step #14), the transport vehicle control device 10 outputs the warning information (step #9). In this way, if, in the second adjustment control, the amount of displacement (second displacement amount D2) of the pedestal upper face 2a of the loading pedestal 2 (here, the plurality of projections 21) in the second shot image IM2 with the second reference image data SD2 as a reference exceeds the second threshold TH2, the transport vehicle control device 10 outputs the warning information without causing the overhead transport vehicle 3 to execute the second transfer operation. Note that the above-described steps #10 to #15 correspond to the second adjustment control.

Other Embodiments (1) In the above-described embodiment, an example has been described in which the first reference image data SD1 and the second reference image data SD2 that are obtained for the reference loading pedestal 2S are used as constant data during the operation of the article transport facility 100. However, the present invention is not limited to such a configuration, and a configuration as described below is also conceivable. Here, one of the plurality of loading pedestals 2 is defined as a "specific loading pedestal", the first adjustment control for adjusting the relative positional relationship between the holding portion 31 and the article W placed on this specific loading pedestal is defined as "first specific adjustment control", and the second adjustment control for adjusting the relative positional relationship between the holding portion 31 and the specific loading pedestal is defined as "second specific adjustment control". In this case, after the first specific adjustment control, the transport vehicle control device 10 may update, based on the first shot image IM1 used in this first specific adjustment control, the first reference image data SD1 to be used in the next first specific adjustment control. That is to say, if the first adjustment control is performed on the loading pedestal 2 for which the first adjustment control has ever been performed before, the first reference image data SD1 that is used in the current first adjustment control may be generated based on the first shot image IM1 obtained in the previous first adjustment control. In this case, preferably, the reference position of the holding portion 31 that defines the "reference state" is also defined as the position defined based on the updated first reference image data SD1. In other words, the reference position of the holding portion 31 is also updated based on the first shot image IM1 obtained in the previous first adjustment control. Also, after the second specific adjustment control, the transport vehicle control device 10 may update, based on the second shot image IM2 used in this second specific adjustment control, the second reference image data SD2 to be used in the next second specific adjustment control. In other words, when the second adjustment control is performed on the loading pedestal 2 for which the second adjustment control has ever been performed before, the second reference image data SD2 that is used in the current second adjustment control may be generated based on the second shot image IM2 obtained in the previous second adjustment control. In this case, preferably, the reference position of the holding portion 31 that defines the "reference state" is also defined as the position defined based on the updated second reference image data SD2. In other words, the reference position of the holding portion 31 is also updated based on the second shot image IM2 obtained based on the previous second adjustment control.

(2) In the above-described embodiment, an example has been described in which if, in the first adjustment control, the first displacement amount D1 exceeds the first threshold TH1, the transport vehicle control device 10 outputs the warning information without causing the overhead transport vehicle 3 to execute the first transfer operation, and if, in the second adjustment control, the second displacement amount D2 exceeds the second threshold TH2, the transport vehicle control device 10 outputs the warning information without causing the overhead transport vehicle 3 to execute the second transfer operation. However, the present invention is not limited to such a configuration, and a configuration is also possible in which, if the first displacement amount D1 exceeds the first threshold TH1, or if the second displacement amount D2 exceeds the second threshold TH2, the operation of the article transport facility 100 is halted. Alternatively, a configuration is also possible in which none of the first displacement amount D1 and the second displacement amount D2 is calculated.

Figure 8:
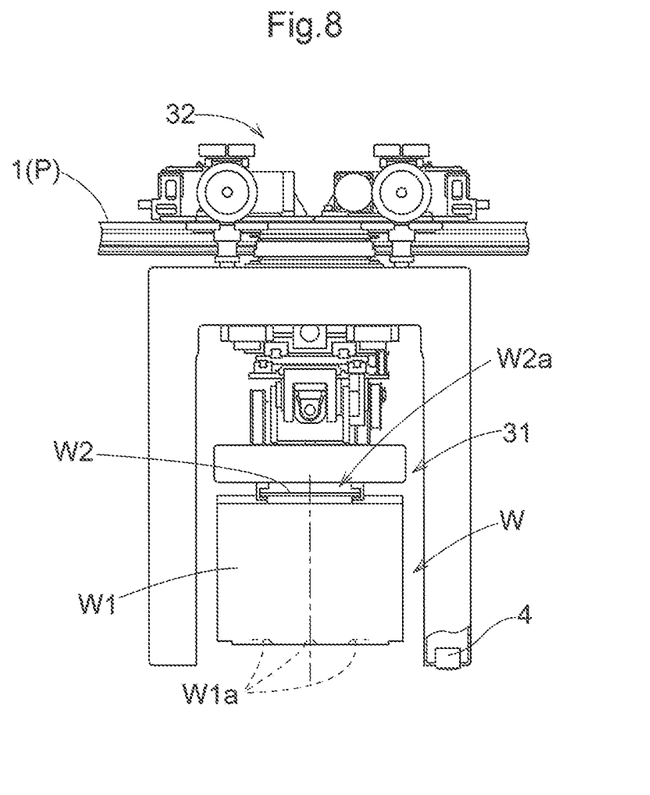
FIG. 8 is a side view illustrating a configuration of an overhead transport vehicle according to another embodiment.

(3) In the above-described embodiment, an example has been described in which the shooting device 4 is mounted on the holding portion 31. However, the present invention is not limited, and a configuration is also possible in which, for example, the shooting device 4 is fixed to a lower end portion of the cover body 3a as shown in FIG. 8. Even with such a configuration, the relative positional relationship between the position of the shooting device 4 and the reference position of the holding portion 31 that defines the "reference state" is determined, and thus the first adjustment control and the second adjustment control can be performed, as in the above-described embodiment. Also, the shooting device 4 may also be mounted at another position in, for example, the travel unit 32 of the overhead transport vehicle 3.

(4) In the above-described embodiment, an example has been described in which the shooting device 4 is a stereo camera. However, the present invention is not limited, and a configuration is also possible in which the shooting device 4 is a monocular camera. In this case, for example, a laser range meter may also be provided on the overhead transport vehicle 3, and this laser range meter may also be used to measure the distance between the overhead transport vehicle 3 and the shooting subject T in the up-down direction Z. Alternatively, a configuration is also possible in which the distance between the overhead transport vehicle 3 and the shooting subject T in the up-down direction Z is not measured, and the holding portion 31 is moved up and down by a prescribed height using the lifting/lowering drive unit 33.

(5) Note that the configurations disclosed in any of the above-described embodiments can be applied in combination with the configurations disclosed in another embodiment as long as no contradiction arises. Regarding other configurations as well, the embodiments disclosed in the present specification are merely illustrative in all respects. Accordingly, various modifications can be made as appropriate without departing from the spirit of the present disclosure.

Overview of Above-Described Embodiments

The following will describe the overview of the article transport facility that has been described above.

An article transport facility includes:
a travel rail attached to a ceiling;
a plurality of loading pedestals arranged along the travel rail;
an overhead transport vehicle configured to travel along the travel rail, and transport an article from, among the plurality of loading pedestals, the loading pedestal of a transport origin to the loading pedestal of a transport destination;
a shooting device that is mounted on the overhead transport vehicle, and is configured to shoot a shooting subject located below the overhead transport vehicle to obtain a shot image; and
a control device configured to control the overhead transport vehicle and the shooting device;
wherein the overhead transport vehicle includes a holding portion for holding the article, and is configured to perform a first transfer operation of holding, using the holding portion, the article placed on the loading pedestal of the transport origin, and a second transfer operation of placing the article held by the holding portion onto the loading pedestal of the transport destination, and
letting image data based on the shot image in which an upper face of the article serves as the shooting subject, and that is obtained when a positional relationship between the overhead transport vehicle and the upper face of the article is in a reference state be first reference image data, and image data based on the shot image in which an upper face of the loading pedestal serves as the shooting subject, and that is obtained when a positional relationship between the overhead transport vehicle and the upper face of the loading pedestal is in a reference state be second reference image data,
when the overhead transport vehicle performs the first transfer operation, the control device executes, before the first transfer operation, first adjustment control of causing the shooting device to obtain a first shot image, which is the shot image in which the upper face of the article placed on the loading pedestal of the transport origin serves as the shooting subject, and adjusting a relative positional relationship between the holding portion and the article placed on the loading pedestal of the transport origin, based on the first shot image and the first reference image data; and
when the overhead transport vehicle performs the second transfer operation, the control device executes, before the second transfer operation, second adjustment control of causing the shooting device to obtain a second shot image, which is the shot image in which the upper face of the loading pedestal of the transport destination serves as the shooting subject, and adjusting a relative positional relationship between the holding portion and the loading pedestal of the transport destination, based on the second shot image and the second reference image data.

With this configuration, using the first reference image data and the second reference image data that are obtained before or after the operation of the article transport facility, the first adjustment control and the second adjustment control are executed during an operation of the article transport facility. In other words, there is no need to execute, before the operation of the article transport facility, teaching processing of acquiring a relative positional relationship between the holding portion and the shooting subject, and setting an amount of adjustment of the position of the holding portion based on this positional relationship, and it is sufficient to obtain the first reference image data and the second reference image data before or after the operation of the article transport facility. Accordingly, time required for a work before the operation of the article transport facility can be reduced drastically. Accordingly, it is possible to suppress the time required before the operation of the article transport facility is started.

Here, the control device is preferably such that, if, in the first adjustment control, an amount of displacement of the upper face of the article in the first shot image with the first reference image data as a reference exceeds a prescribed first threshold, the control device outputs warning information without causing the overhead transport vehicle to execute the first transfer operation, and
if, in the second adjustment control, an amount of displacement of the upper face of the loading pedestal in the second shot image with second reference image data as a reference exceeds a prescribed second threshold, the control device outputs the warning information without causing the overhead transport vehicle to execute the second transfer operation.

With this configuration, if a displacement of the overhead transport vehicle and/or the article is large, it is possible to immediately notify an operator.

Furthermore, preferably, letting a direction along the travel rail be a travel direction, and a direction orthogonal to the travel direction when viewed in a plan view be a width direction,
the overhead transport vehicle includes: the holding portion, a travel unit configured to travel in the travel direction; a lifting/lowering drive unit configured to move the holding portion up and down with respect to the travel unit; a slide drive unit configured to cause the holding portion to slide with respect to the travel unit in the width direction; and a rotation drive unit configured to rotate the holding portion with respect to the travel unit around a rotation axis extending in an up-down direction, and
in each of the first adjustment control and the second adjustment control, the control device controls the travel unit to adjust the position of the holding portion in the travel direction, controls the slide drive unit to adjust the position of the holding portion in the width direction, and controls the rotation drive unit to adjust the rotational position of the holding portion around the rotation axis.

With this configuration, in each of the first adjustment control and the second adjustment control, the position of the holding portion in the travel direction, the position of the holding portion in the width direction, and the rotational position of the holding portion can be appropriately adjusted.

In the configuration in which the overhead transport vehicle includes the holding portion, the travel unit, the lifting/lowering drive unit, the slide drive unit, and the rotation drive unit, preferably, the shooting device is a stereo camera, and
the control device determines a distance in the up-down direction between the overhead transport vehicle and the shooting subject based on the shot image, and controls the lifting/lowering drive unit to adjust the position of the holding portion in the up-down direction in each of the first adjustment control and the second adjustment control.

With this configuration, since the shooting device is a stereo camera, it is possible to appropriately determine the distance in the up-down direction between the overhead transport vehicle and the shooting subject, based on the shot image obtained by the shooting device. Accordingly, in each of the first adjustment control and the second adjustment control, the position of the holding portion in the up-down direction can be appropriately adjusted.

Furthermore, preferably, a plurality of the overhead transport vehicles are arranged along the travel rail, and
each of the plurality of overhead transport vehicles includes a storage unit for storing the first reference image data and the second reference image data.

With this configuration, the first reference image data and the second reference image data that correspond to each overhead transport vehicle can be stored in the storage unit of this overhead transport vehicle. Accordingly, the first adjustment control and the second adjustment control can be accurately executed on each overhead transport vehicle.

Furthermore, with this configuration, after the shooting device mounted on an overhead transport vehicle has obtained the first shot image or the second shot image, it is easy to immediately compare the first shot image or the second shot image with the first reference image data or the second reference image data stored in the storage unit of this overhead transport vehicle. Accordingly, it is possible to promptly execute the first adjustment control and the second adjustment control.

Furthermore, preferably, letting one of the plurality of loading pedestals be a specific loading pedestal, the first adjustment control for adjusting the relative positional relationship between the holding portion and the article placed on the specific loading pedestal be first specific adjustment control, and the second adjustment control for adjusting the relative positional relationship between the holding portion and the specific loading pedestal be second specific adjustment control,
after the first specific adjustment control, the control device updates, based on the first shot image used in this first specific adjustment control, the first reference image data to be used in the next first specific adjustment control, and
after the second specific adjustment control, the control device updates, based on the second shot image used in this second specific adjustment control, the second reference image data to be used in the next second specific adjustment control.

With this configuration, the first reference image data and the second reference image data that include displacement of the overhead transport vehicle and the article that occurs with time can be used. Accordingly, it is possible to accurately detect displacement of the overhead transport vehicle and the article that may occur due to an unexpected situation, different from displacement of the overhead transport vehicle and the article that occurs with time.

Furthermore, preferably, the article is a container provided with, in an upper portion of the article, a flange portion configured to be held by the holding portion,
the loading pedestal includes a plurality of projections that are formed protruding from the upper face of the loading pedestal, and are configured to respectively engage with a plurality of recesses formed in a bottom surface of the article,
the upper face of the article serving as the shooting subject includes an upper face of the flange portion, and
the upper face of the loading pedestal serving as the shooting subject includes the plurality of projections.

With this configuration, it is possible to accurately perform a comparison between the first shot image and the first reference image data in the first adjustment control, and a comparison between the second shot image and the second reference image data in the second adjustment control. Accordingly, it is possible to accurately perform the first adjustment control and the second adjustment control.

INDUSTRIAL APPLICABILITY

The technique according to the present disclosure is applicable to an article transport facility that includes a travel rail attached to a ceiling, a plurality of loading pedestals arranged along the travel rail, and an overhead transport vehicle that travels along the travel rail, and transports an article from a loading pedestal of a transport origin to a loading pedestal of a transport destination.

What is claimed is:

1. An article transport facility comprising:
a travel rail attached to a ceiling;
a plurality of loading pedestals arranged along the travel rail;
an overhead transport vehicle configured to travel along the travel rail and transport an article from, among the plurality of loading pedestals, the loading pedestal of a transport origin to the loading pedestal of a transport destination;
a shooting device that is mounted on the overhead transport vehicle and is configured to shoot a shooting subject located below the overhead transport vehicle to obtain a shot image; and
a control device configured to control the overhead transport vehicle and the shooting device;
wherein the overhead transport vehicle includes a holding portion for holding the article, the overhead transport vehicle configured to perform a first transfer operation of holding, using the holding portion, the article placed on the loading pedestal of the transport origin, and a second transfer operation of placing the article held by the holding portion onto the loading pedestal of the transport destination, and
wherein image data based on the shot image in which an upper face of the article serves as the shooting subject, and that is obtained when a positional relationship between the overhead transport vehicle and the upper face of the article is in a reference state is first reference image data, and wherein image data based on the shot image in which an upper face of the loading pedestal serves as the shooting subject, and that is obtained when a positional relationship between the overhead transport vehicle and the upper face of the loading pedestal is in a reference state is second reference image data,
wherein when the overhead transport vehicle performs the first transfer operation, the control device executes, before the first transfer operation, first adjustment control of causing the shooting device to obtain a first shot image, which is the shot image in which the upper face of the article placed on the loading pedestal of the transport origin serves as the shooting subject, and adjusting a relative positional relationship between the holding portion and the article placed on the loading pedestal of the transport origin, based on the first shot image and the first reference image data; and wherein when the overhead transport vehicle performs the second transfer operation, the control device executes, before the second transfer operation, second adjustment control of causing the shooting device to obtain a second shot image, which is the shot image in which the upper face of the loading pedestal of the transport destination serves as the shooting subject, and adjusting a relative positional relationship between the holding portion and the loading pedestal of the transport destination, based on the second shot image and the second reference image data.

2. The article transport facility according to claim 1,
wherein in the first adjustment control, if an amount of displacement of the upper face of the article in the first shot image with the first reference image data as a reference exceeds a prescribed first threshold, the control device outputs warning information without causing the overhead transport vehicle to execute the first transfer operation, and
wherein in the second adjustment control, if an amount of displacement of the upper face of the loading pedestal in the second shot image with second reference image data as a reference exceeds a prescribed second threshold, the control device outputs the warning information without causing the overhead transport vehicle to execute the second transfer operation.

3. The article transport facility according to claim 1,
wherein a direction along the travel rail is a travel direction, and a direction orthogonal to the travel direction when viewed in a plan view is a width direction,
wherein the overhead transport vehicle comprises:
the holding portion;
a travel unit configured to travel in the travel direction;
a lifting/lowering drive unit configured to move the holding portion up and down with respect to the travel unit;
a slide drive unit configured to cause the holding portion to slide with respect to the travel unit in the width direction; and
a rotation drive unit configured to rotate the holding portion with respect to the travel unit around a rotation axis extending in an up-down direction, and
wherein in each of the first adjustment control and the second adjustment control, the control device controls:
the travel unit to adjust the position of the holding portion in the travel direction;
the slide drive unit to adjust the position of the holding portion in the width direction; and
the rotation drive unit to adjust the rotational position of the holding portion around the rotation axis.

4. The article transport facility according to claim 3,
wherein the shooting device is a stereo camera, and
wherein the control device determines a distance in the up-down direction between the overhead transport vehicle and the shooting subject based on the shot image, and controls the lifting/lowering drive unit to adjust the position of the holding portion in the up-down direction in each of the first adjustment control and the second adjustment control.

5. The article transport facility according to claim 1,
wherein a plurality of the overhead transport vehicles is arranged along the travel rail, and
wherein each of the plurality of overhead transport vehicles includes a storage unit for storing the first reference image data and the second reference image data.

6. The article transport facility according to claim 1,
wherein, if one of the plurality of loading pedestals is a specific loading pedestal, the first adjustment control for adjusting the relative positional relationship between the holding portion and the article placed on the specific loading pedestal is first specific adjustment control, and the second adjustment control for adjusting the relative positional relationship between the holding portion and the specific loading pedestal is second specific adjustment control,
wherein after the first specific adjustment control, the control device updates, based on the first shot image used in this first specific adjustment control, the first reference image data to be used in the next first specific adjustment control, and
wherein after the second specific adjustment control, the control device updates, based on the second shot image used in this second specific adjustment control, the second reference image data to be used in the next second specific adjustment control.

7. The article transport facility according to claim 1, wherein:
the article is a container provided with, in an upper portion of the article, a flange portion configured to be held by the holding portion,
the loading pedestal includes a plurality of projections that are formed protruding from the upper face of the loading pedestal, and are configured to respectively engage with a plurality of recesses formed in a bottom surface of the article,
the upper face of the article serving as the shooting subject includes an upper face of the flange portion, and
the upper face of the loading pedestal serving as the shooting subject includes the plurality of projections.

* * * * *